(12) United States Patent
Liu et al.

(10) Patent No.: US 9,273,933 B2
(45) Date of Patent: Mar. 1, 2016

(54) COMPOSITE STRUCTURE AND METHOD OF MAKING A COMPOSITE STRUCTURE

(71) Applicant: Board of Trustees of Michigan State University, East Lansing, MI (US)

(72) Inventors: Dahsin Liu, Okemos, MI (US); Chun-Ying Lee, Changhua (TW); Chian-Fong Yen, Aberdeen Proving Ground, MD (US); Corey Anderson, East Lansing, MI (US); Guojing Li, Okemos, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 8 days.

(21) Appl. No.: 13/897,795

(22) Filed: May 20, 2013

(65) Prior Publication Data

US 2014/0150634 A1 Jun. 5, 2014

Related U.S. Application Data

(60) Provisional application No. 61/648,857, filed on May 18, 2012.

(51) Int. Cl.
| | |
|---|---|
| *F41H 5/04* | (2006.01) |
| *B29C 70/34* | (2006.01) |
| *B29C 70/22* | (2006.01) |
| *B29C 70/24* | (2006.01) |

(52) U.S. Cl.
CPC ............ *F41H 5/0485* (2013.01); *B29C 70/222* (2013.01); *B29C 70/24* (2013.01); *B29C 70/342* (2013.01)

(58) Field of Classification Search
CPC ...................................................... F41H 5/0485
USPC ............... 89/36.02, 36.11, 36.05, 914, 36.01; 428/911, 223; 442/205–207, 218
See application file for complete search history.

(56) References Cited

U.S. PATENT DOCUMENTS

| | | | | |
|---|---|---|---|---|
| 3,769,142 A * | 10/1973 | Holmes | ................... | B29C 70/24 428/113 |
| 4,438,173 A * | 3/1984 | Trost | ..................... | D03D 13/002 139/383 R |
| 4,759,147 A * | 7/1988 | Pirazzini | ................ | A01K 87/00 428/107 |
| 5,104,726 A * | 4/1992 | Ross | ............................. | 442/207 |
| 5,270,094 A * | 12/1993 | Anahara et al. | ................ | 428/113 |
| 5,490,602 A * | 2/1996 | Wilson et al. | .................... | 216/56 |
| 7,087,296 B2 * | 8/2006 | Porter | ................... | B29C 66/721 428/223 |

* cited by examiner

*Primary Examiner* — Reginald Tillman, Jr.
(74) *Attorney, Agent, or Firm* — Harness, Dickey & Pierce, P.L.C.

(57) ABSTRACT

In accordance with the present teachings, a method of producing composite having a 3A Q3D reinforcement phase is disclosed. The method of producing the composite provides producing a three-dimensionally woven configuration where a first fiber from a first sheet of reinforcement phase is interwoven or mechanically linked with at least one of an adjacent second layer and then back into the first sheet. The linking fibers are passed between layers at an acute angle generally less than about 10 degrees. The method includes impregnating the woven construction with a curable polymer such as epoxy.

11 Claims, 5 Drawing Sheets

COMPOSITE STRUCTURE AND METHOD OF MAKING A COMPOSITE STRUCTURE

CROSS-REFERENCE TO RELATED APPLICATIONS

This application claims the benefit of U.S. Provisional Application No. 61/648,857, filed on May 18, 2012. The entire disclosure of the above application is incorporated herein by reference.

STATEMENT OF GOVERNMENTAL SUPPORT

This invention was made with government support under Grant No. W911NF-11-2-0017 awarded by the U.S. Army Research Laboratory. The government has certain rights in the invention.

FIELD

This invention relates generally to composites and, more particularly, to a composite structure having a specific fiber configuration and methods to form a composite structure.

BACKGROUND

Many industries, especially aerospace, energy, and automotive, extensively use composite fabrics because of its strength, damage resistance, and light weight. However, industries are looking to improve delamination resistance while keeping weight and manufacturing costs low. This invention addresses both issues.

The invention, however, may be limited by its patentable scope. People have used weaved and braided fabrics for over 7,000 years, so there is a significant amount of prior art. This invention combines a triaxial (non-orthogonal), laminates, and integrated interlocking inter-laminar yarns into a composite reinforcement. This composite reinforcement can be used in combination with a polymer matrix.

Engineers increasingly use fiber-reinforced composite materials, particularly for automotive, marine, and armor designs, because of high stiffness and strength with low density. Engineers can also tailor the materials' orthotropic properties to specific applications where certain properties are required in only particular directions of a structure.

It is known to employ prepreg composites with stacked material layers (see FIGS. 1A-1D). Each layer typically has resin and fibers, with the fibers being oriented at, for example, any combinations of 45°/0°, 0°/90°, 30°/90°, 60°/90°, 30°/60°, or 90°/0° for relative adjacent layers. Such conventional fiber patterns, however, are prone to severe delamination, cracking and fiber breakage upon projectile impact. To overcome these problems, fibers have been stitched through laminate layers to overcome delamination issues. Unfortunately, needles used to pass through the reinforcement phase can lead to damage or breakage of the fibers in the affected regions. This can reduce the overall strength of the composite structure.

Laminated structures based on stacking composite layers, however, are susceptible to impact loading that causes delamination, which is separation of layers due to breakage of the composite interface. Once delaminated, projectiles can disintegrate the material by displacing the fibers of individual layers. This poor impact resistance restricts composites from many applications, despite many efforts to understand impact response and improve delamination resistance.

SUMMARY

In accordance with the present invention, a composite structure intended to overcome the deficiencies of the prior art is provided. In another aspect of the present invention, a composite structure has a tri-axial quasi-three-dimensional (3A Q3D) composite. The fabric reinforcement phase is formed of interwoven layers. The 3A Q3D fabric provides constant strength in all directions, which is an improvement over previous biaxial 2-Axis woven fabrics that only have strength in two major directions and suffer the afore-described deficiencies.

In accordance with another embodiment of the present teachings, a composite having a 3A Q3D reinforcement phase is disclosed. The composite provides a material having improved delamination and impact resistance over conventional two-dimensional woven fabric while maintaining adequate in-plane stiffness.

In accordance with the present teachings, a method of producing composite having a 3A Q3D reinforcement phase is disclosed. The method of producing the composite provides producing a three-dimensionally woven configuration where a first fiber from a first sheet of reinforcement phase is interwoven or mechanically linked with at least one fiber or yarn in at least one of an adjacent second layer and then back into the first sheet. The linking fibers are passed between layers at an acute angle generally less than about 10 degrees with respect to the first sheet. The method includes impregnating the woven construction with a curable polymer such as epoxy.

According to another embodiment, a method of producing a 3A Q3D composite is disclosed. The method includes forming a knit tube having a plurality of interlocked layers. During the formation of the tube, a plurality of fibers are passed between the layers and incorporated into an adjacent layer. The tube of knit material is cut to form a planar knit construction. Uncured polymer is then incorporated into the planar knit construction and cured.

The composite structure of the present teachings is advantageous over traditional constructions in that the present invention allows for fiber bridging spanning a matrix material, generally without significant delamination, upon projectile impact. The system allows for up to 90% energy absorption of the impact without significant structural composite failure. The present invention is thereby ideally suited for use in armor plating without the conventional weight of metallic materials and with the ease of forming curved yet thin shapes. Additional advantages and features of the present invention will become apparent from the following description, taken in conjunction with the accompanying drawings.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. The invention seems to be a notable improvement in composite design. The braiding technique improves the fabric's toughness and delamination resistance without the additional weight or damage of 3D stitching.

Generally, the triaxial quasi 3D composites shown in FIGS. 2A-4C of the present teachings are better suited to accommodate out-of-plane loading, particularly in military and aerospace applications, because there is constant strength in all directions (0/60/−60-isotropic), rather than strength in two orthogonal directions. Because the reinforcement phase of the composite is formed using knitting machines, it is envisioned a 3A Q3D composite using fibers directed in alternative patterns such as, by way of non-limiting example, including yarns in four directions (0/90/45/−45) can also be formed. According to the present teachings, by tying the layers together (one layer above or below), the interlocking yarns resist delamination propagation, limiting damage, which increases the strength and life enough for later repair.

For strength reasons related to the intra-laminar layers, it is generally preferred to have reinforcement not change direction too often. As such, for example, a 0° fiber woven or knitted within a first layer can be shuttled down through another intermediate layer or layers and knit or woven into the second layer having fibers in the 0° fiber direction. In this regard, the intermediate layers can be, for example, −60° and/or 60°.

The Q3D fabric performs better than laminated 2D fabric in impact, torsion and bending. According to one embodiment, the braiding machine forms a tube structure which can be used to form a 3D structure such as a pipe or flattened into a two layer reinforcement. Additionally, for flat fabric reinforcement structures, the fabric reinforcement tube is cut using a laser or mechanical cutting device and laid out prior to matrix incorporation. It is possible to braid the fabric dry, with sizing, or wet to assist in incorporating the matrix into the composite. It is envisioned 3D 3A Q3D shaped (i.e., I-beam) composites with interlocking layers can be formed using the braiding machine. The fiber reinforcement is formed by a braiding machine. Uncured polymer matrix material such as uncured epoxy is then impregnated into the braided structure using, for example, vacuum or pressure. It is envisioned the matrix can have appropriate rheological properties to allow incorporation of the uncured matrix between the fibers. It is also envisioned the fibers can treated to improve wettability thus improving the fiber matrix interface properties.

Figures 1A, 1B, 1C, 1D:
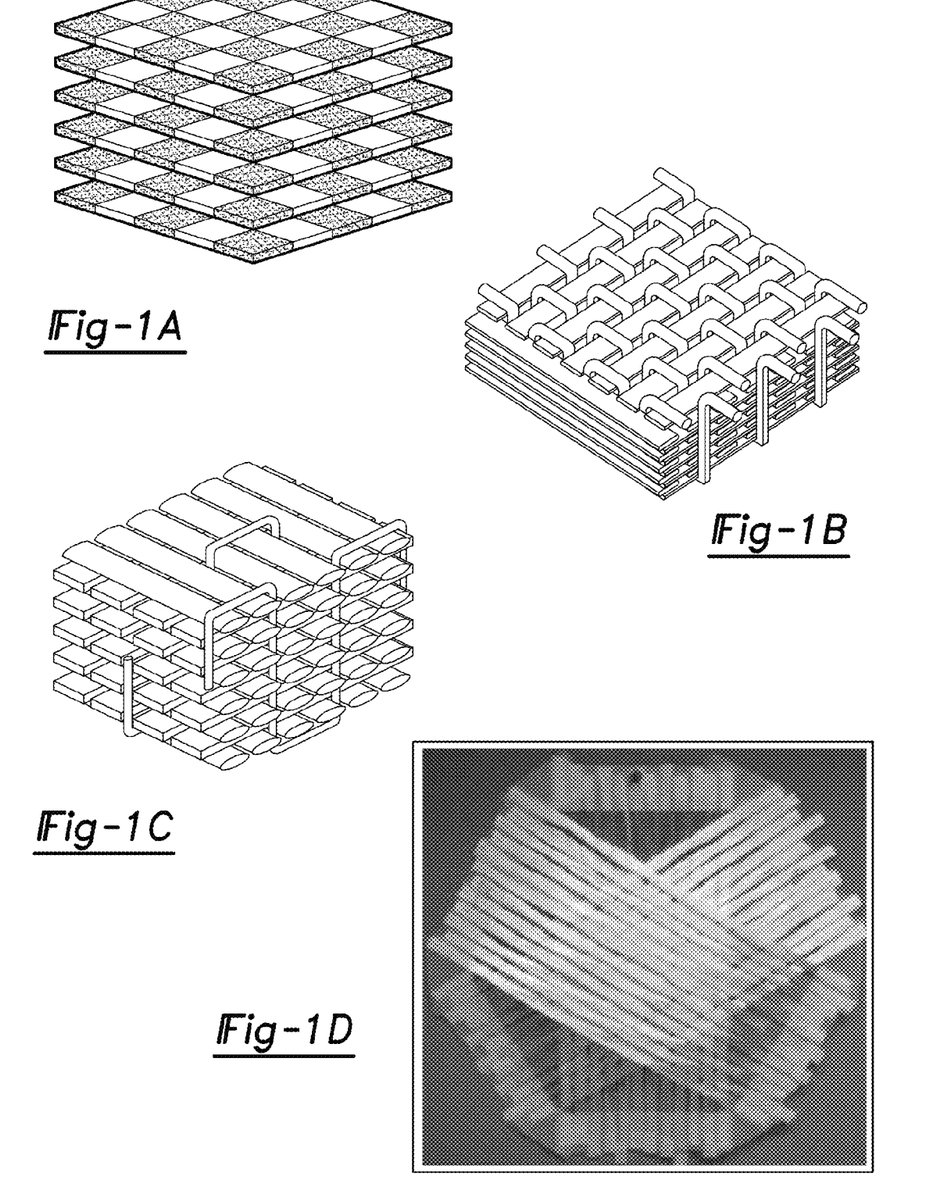
FIGS. 1A-1D represent fiber layups according to the prior art.
Figure 2A:
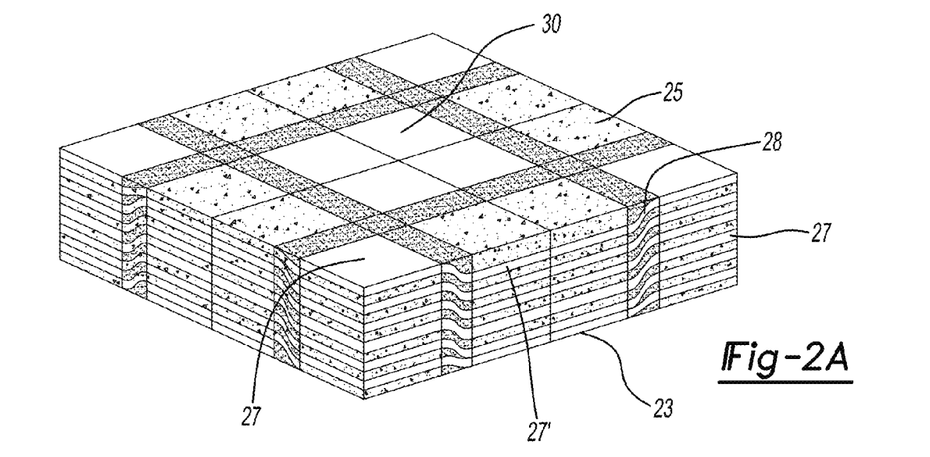
FIGS. 2A-2C represent fiber layups according to the present invention.
Figure 2B:
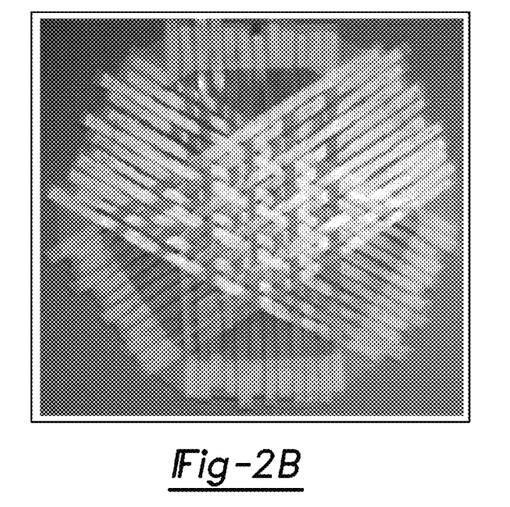
Figure 2C:
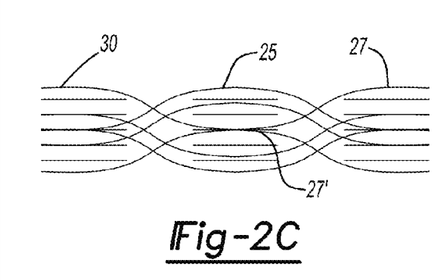
Figure 3:
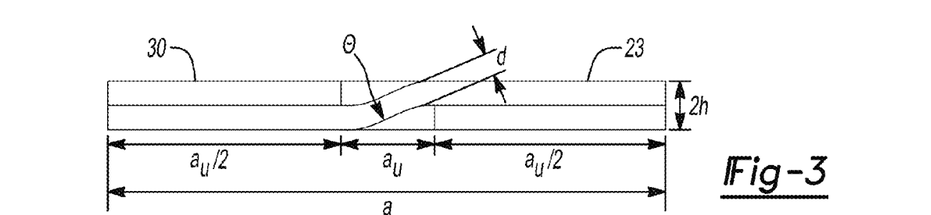
FIG. 3 represents a cross-sectional view of the layup shown in FIG. 2A.

A first preferred embodiment, a 3A Q3D controlled composite structure 21 of the present invention is shown in FIGS. 2A-3. Composite structure 21 includes multiple knitted or woven layers 23, with an outer skin composite layer 25, and inner skin composite layers 27 which are, as described below, all permanently joined together by inter-laminar or layer fibers 28. While being formed, layers 23 are knit on a braiding machine and have a repeating overlapping cylindrical shape. Skin layers 25 surround the laminate construction such that the skin only contacts the exterior surface of bound layers 23. Outer skin layers 25 act as an aerodynamic surface on an aerospace craft or vehicle such as a leading edge of an airplane wing, the underside of a helicopter, or an outer shield for a satellite; alternately outer skin layers 25 can be used as an outer surface of a ship hull, other marine and/or vehicle, or the like. It is envisioned the various layers 25, 27 can be engineered and have differing fiber materials.

As shown in FIG. 2A, a single fiber or bundle of fibers is shuttled from a first layer 27 to a second inner layer 27' and then back to the first layer 27. As the strength of the composite is at least partially dictated by the straightness of a long fiber reinforcement phase, the angle θ (see FIG. 3) should be minimized by keeping a unit cell 30 of the composite reinforcement at an appropriate size (greater than about ¼") to the angle θ of less than about 20 degrees and, preferably, less than 10 degrees to a tangent or the plane of the layer. In the event the knit construction is tight, the angle of the out of plane fiber direction is increased. It should be appreciated that the angle θ is a function of the space between the unit cells $a_u$ of the knit structure. FIG. 2B represents a top view of the 3A Q3D reinforcement according to the present teachings. Shown is the outer layer 25 of the reinforcement phase. Inter-laminar fibers are shuttled between the outer skin 25 and an interstitial fiber 28.

Figure 4A:
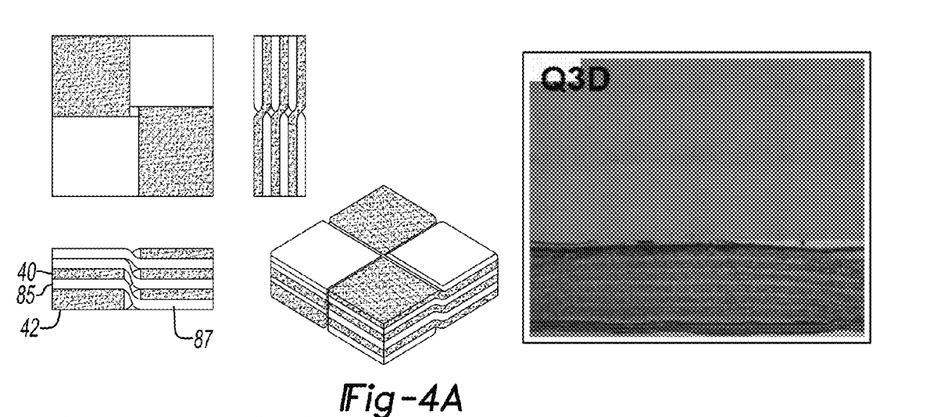
FIGS. 4A-4C represent alternate embodiments of the composite according to the present teachings.
Figure 4B:
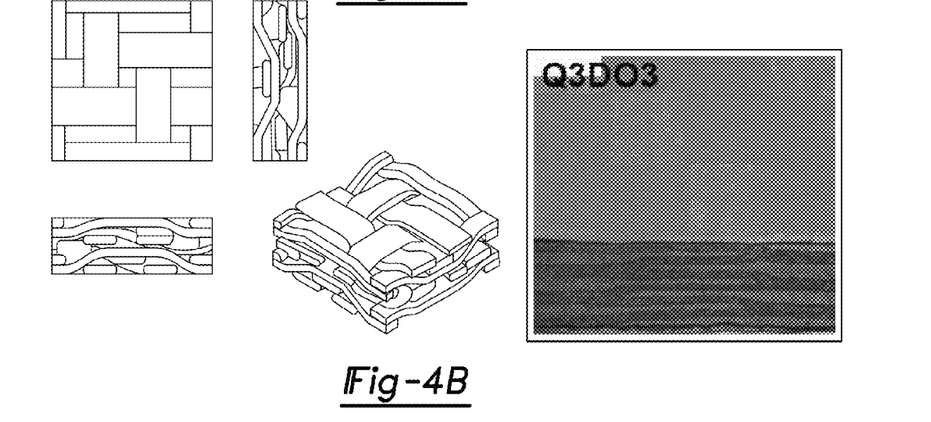
Figure 4C:
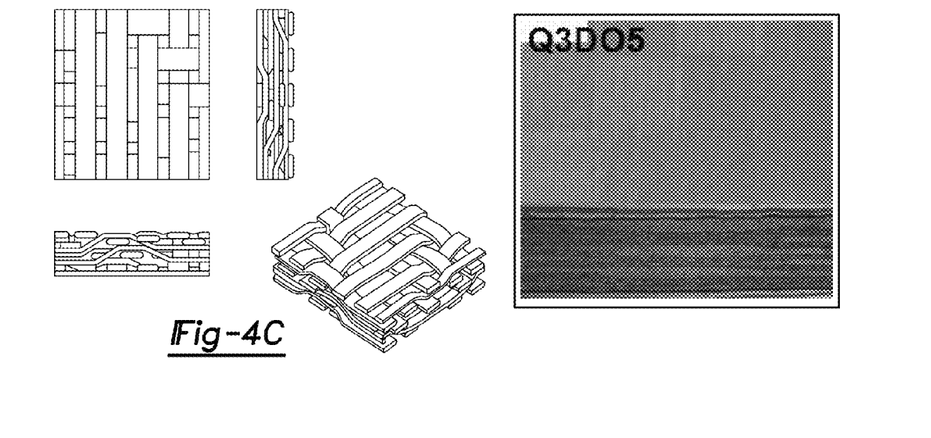

Another preferred embodiment of a composite structure of the present invention is shown in FIGS. 4A-4C. A segment 40 has a generally planar base segment 42. It should be appreciated that inner and outer skins 25, such as those shown in FIG. 3, may also be employed with any of these preferred embodiments disclosed herein depending upon whether aerodynamic or aesthetic covering of the curved shape is desired.

All of the presently disclosed preferred embodiment composite structures are made by: (1) knitting tubes of annularly disposed overlapping sheets or layers made of reinforcing and interlocking fibers and resin; or (2), a "two-dimensional" weave between two adjacent fiber bundles, with each woven layer or ply then being stacked upon each other in an overlapping manner with resin applied before or after the weaving to join the fabric layers. With either approach, the adjacent layer-to-layer fiber orientation is approximately 0°, and the immediately adjacent fiber orientation are between 60° and −60° inclusive and, more preferably, about 0° and between 5°-15°, inclusive. It should be appreciated that the desired fiber orientation is the primary or average fiber orientation as the fibers may not be perfectly straight and may have a slight tolerance variation during manufacturing. Furthermore, the 0° orientation is simply a base reference angle from which the adjacent layer orientation is measured. This fiber orientation is shown in an exaggerated fashion wherein a first layer 81 has a reference orientation of 0° and the immediately adjacent layer 83 has a relative reference fiber orientation of 5°. Similarly, in the woven scenario, a warp fiber 85 has a reference orientation of 0°, while a woven and interlinking weft fiber 87 has a reference orientation of about 0-5°.

The laminated version of the present invention can be made from a prepreg tape or fabric, or a fiber preform outer layer and an inner construction having a (3A Q3D) structure. Glass fibers, fabrics and braided preforms are preferred for land vehicles and marine structures due to their high specific strength properties. Polymeric fibers, fabrics and braided preforms, such as Kevlar® aramid, Spectra® polyethylene or Dyneema® polyethylene are preferred for military applications due to their high specific energy absorption characteristics. Furthermore, carbon fibers, fabrics and braided preforms are preferred for aerospace vehicles due to their high specific stiffness properties. Toughened epoxy resins are desirable in the specific curing temperatures is dependent on the type of epoxy resin used. For example, if manufacturing convenience is of primary concern, then a low temperature and low viscosity epoxy resin should be employed. If the structure is to be used in high temperature environments, however, a high temperature epoxy would be desirable.

The following preferred manufacturing steps are employed with the laminated versions of the preferred embodiment composite structures. First, the fiber preform is prepared by selecting materials and braiding a tubular structure with small angle differences between warp and weft yarns, or three-dimensional fabrics with small angular differences between linked layers. As previously described, the fibers can be pre-wetted or sized to assist in the incorporation of an uncured matrix epoxy material. The tubular structure is removed from the knitting machine and slit to form a 2D Q3D layered structure. Third, a clean mold with the designated component geometry is made. Fourth, the mold is waxed, and fifth, a sealant tape is applied around a perimeter of the mold. Sixth, the operator cuts a peel ply and places it on the mold surface. Seventh, the operator places the fiber preform over the peel ply and marks its outline on the peel ply before removing it from the mold. Eighth, the user prepares the epoxy matrix by mixing a hardener and the resin into the designated ratio. Furthermore, ninth, the user applies the mixed epoxy to the peel ply on the marked area for the fiber preform. Tenth, the user places the fiber preform on the epoxy and eleventh, adds a second layer of peel ply over the fiber preform. Twelfth, the user adds a bleeder/breather fabric on the top of the second peel ply. Thirteenth, a vacuum bag is applied to the sealant tape on the mold and fourteenth, a vacuum gauge is inserted at one end of the mold. Fifteenth, the user sets up the vacuum pump and piping, and fifteenth, turns on the pump to impregnate the fiber preform with the epoxy matrix and cures the epoxy. Seventeenth, the composite structure is trimmed and eighteenth, the user inspects the composite structure for design compliance. Nineteenth, the composite component is applied to a secondary assembly with adhesive bonding and nineteenth, the operator conducts a final assembly inspection. Finally, the composite structure assembly is packaged and shipped.

Figure 5A:
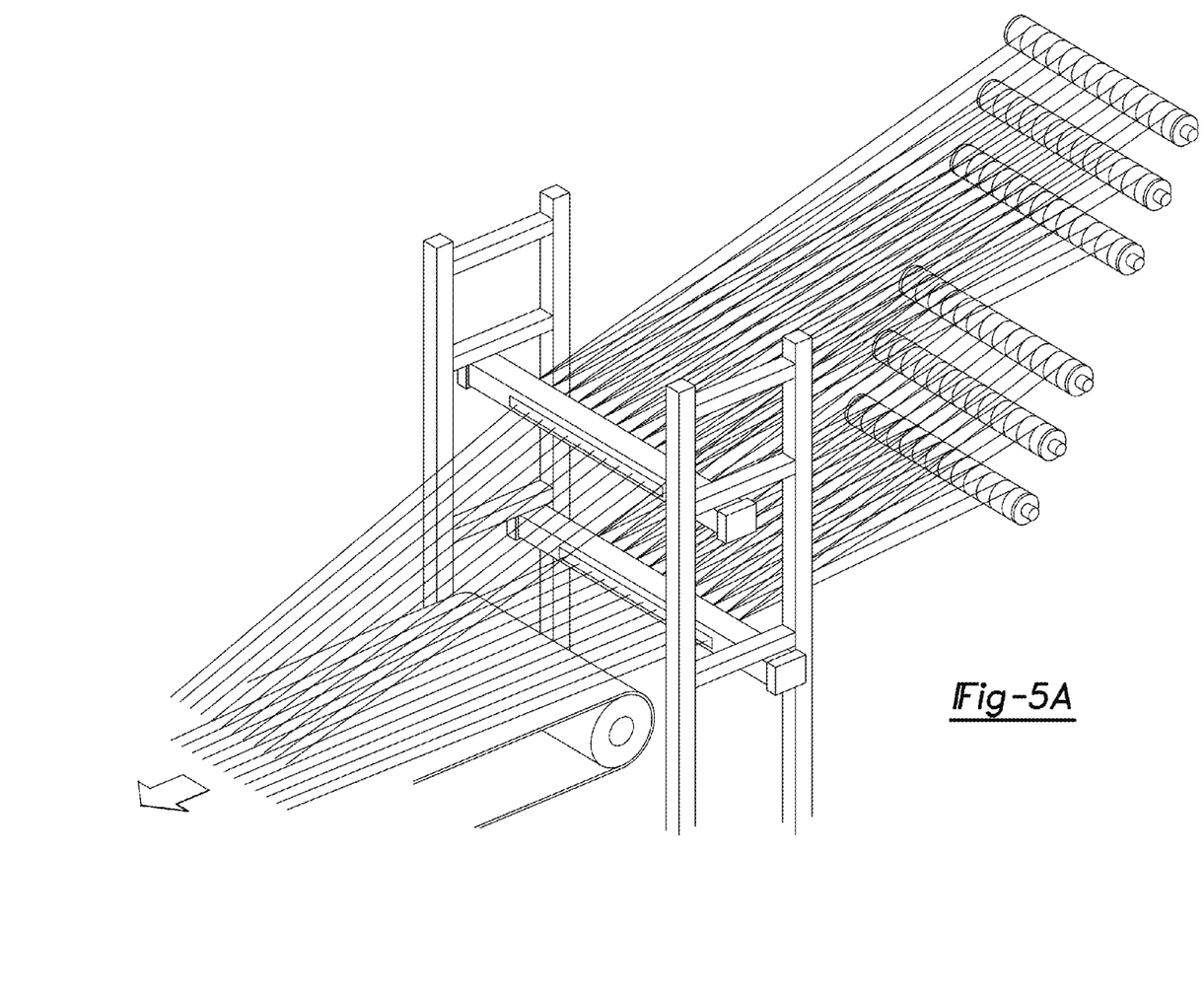
FIGS. 5A-5C represent equipment used to form composites according to the present teachings.
Figure 5B:
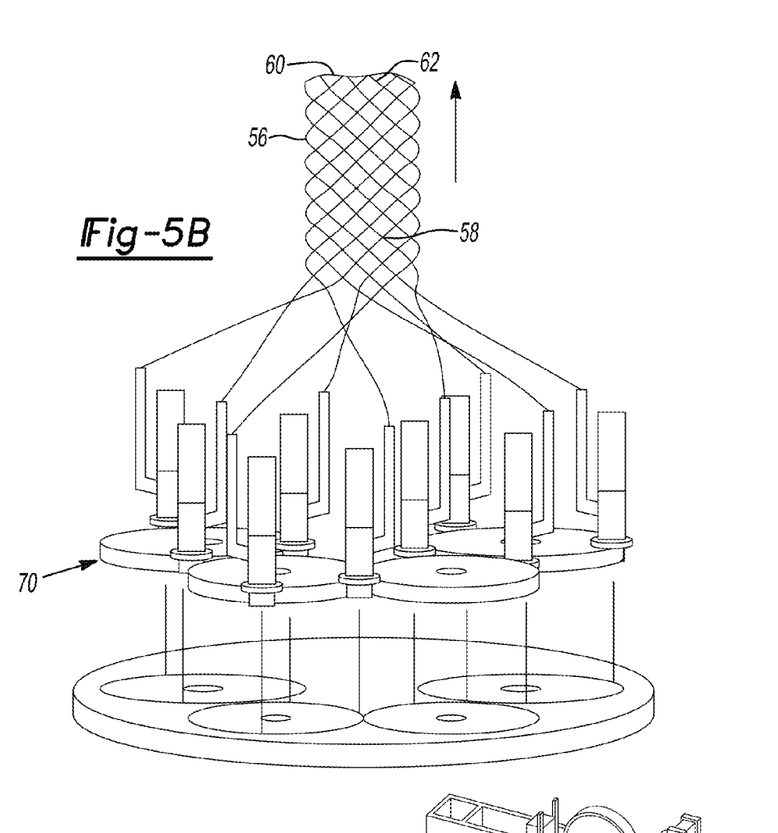
Figure 5C:
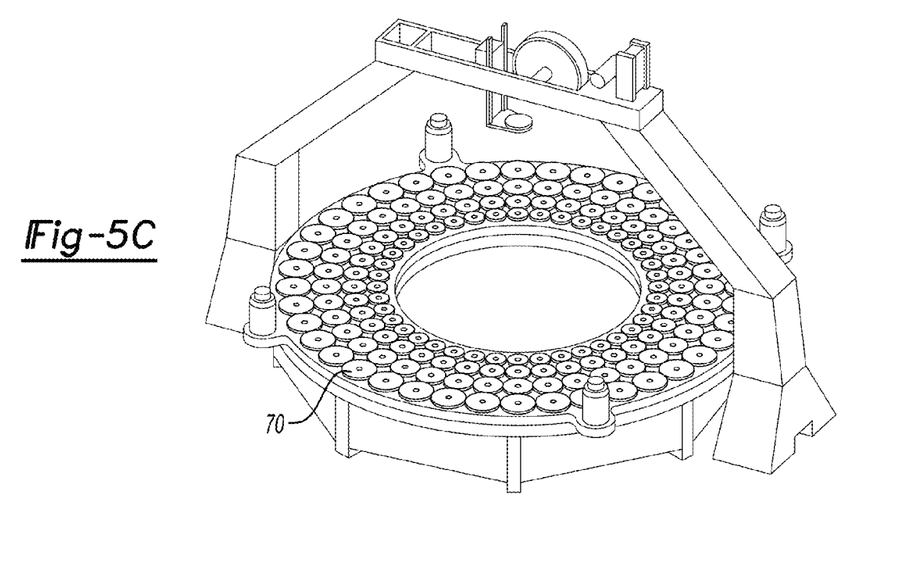

FIGS. 5A-5C illustrate the forming equipment for the composite structure. In this embodiment, a component shaped segment 52, including multiple joined fiber and resin sheets, is attached between outer composite skin layers 25 and middle composite skin layers 27.

FIG. 5A discloses the formation of a series of elongated, tube-like bound segments 58 affixed between composite reinforcement outer and inner skins 60 and 62, respectively. Tubular segments 58 each have a generally cylindrical shape. Each of the composite segments and skins includes multiple interconnected 3A Q3D sheets of fiber layers. The inside of each tubular segment 58 is also open or hollow. The tubular segments 58 are further generally parallel to each other. As shown in FIGS. 5B and 5C, during the formation of the reinforcement phase, the outer layer is knitted or woven with an adjacent layer by movement of the spool in relation to the braided configuration. A rotated head portion 70 can be used to change the orientation of the construction with respect to the fiber feed speeds.

To clarify the description above, each set of layers of the structure, by way of non-limiting example having yarns of 0°, −60°, +60° can be defined as a unit layer. A four unit layer laminate will have a minimum of 12 yarns, three at each orientation. Clearly, numerous parallel yarns for each direction and each unit layer is practicable for simplicity of description a single set of fibers will be described. To maintain the yarns as flat as possible, it is preferred that the yarns from one unit layer will be shuttled to a second adjacent layer and will not immediately be transferred through an adjacent unit layer before interaction with off angle fibers. For example, a 0° fiber from the first unit layer can be passed to the second unit layer before crossing either or both of the +60°, −60° yarns of the second unit layer. Likewise, the 0° fiber from the second unit layer can be shuttled up to the first unit layer or the third unit layer. Generally, as described above, it is preferred the fiber have a 10° or less and with respect to the parent unit layer plane.

After a yarn is shuttled up or down to an adjacent layer, and that yarn crosses an off angle yarn (e.g. 60°, −60°), it can then stay in the same layer for several engagements with the off angle yarns, or it can be shuttled to either an upper or lower adjacent unit layer. In this manner, a yarn which begins at unit level can be shuttled through the layers to the last layer as long as it crosses an off angle fiber or travels within the layer for a requisite distance.

As described above, each fiber or yarn 0°, 60°, −60° preferably is shuttled to an adjacent unit layer to bind the unit layers together. Each fiber can maintain its 0°; −60°, +60° orientation at each of the unit layers. It is envisioned that the reinforcement layer can have different fiber directions. For example, each unit layer can be balanced and can have four yarns (0/90/45/−45).

While various aspects of the present invention have been disclosed, it should be appreciated that other variations may fall within the scope of the present invention. For example, a clear reinforced windshield can be formed. In this regard, a clear panel can be formed using transparent fibers such as reinforced glass fiber. Additionally, the epoxy matrix material should be clear. To maximize light transmission through the panel, the system is designed so the index of refraction is the same in the transparent reinforcement phase and the epoxy matrix material. To maintain the localized material properties, each intersection of the yarns can have a single yarn for a given direction. Inter-laminar movement of a yarn can be to opposed layers. For example, on the second unit layer, the 0° yarn can be shuttled to the first unit layer and the 60° yarn can be shuttled to the third unit layer. Optionally, the −60° yarn can be maintained on the second unit layer or can be shuttled to the first or third unit layer. It is envisioned, the composite layers provide aircraft or land vehicle armor operable to substantially stop complete bullet-like projectile perforation.

Optionally, when one fiber is shuttled from a first unit layer to the second unit layer, a corresponding fiber will be shuttled from the second unit layer to the first unit layer. In this regard, a 0° fiber from the first unit layer can be shuttled to the second unit layer, while the 0° fiber is being shuttled from the unit layer to the first unit layer.

It is intended by the following claims to cover these and any other departures from the disclosed embodiment which falls within the true spirit of this invention. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90° s or at other orientations) and the spatially relative descriptors used herein interpreted accordingly.

What is claimed is:

1. A composite structure comprising:
a first unit fiber composite layer having a respective relative fiber directions of about 0°, and 60° and −60°;
a second unit fiber composite layer having a respective relative fiber directions of about 0°, and 60° and −60° with respect to the fiber directions of about 0° of the first unit fiber composite layer and a first side adjacent the first fiber composite layer and a second opposed side in relation to the first composite layer, the layers being secured together adjacent each other in an overlapping manner such that a portion of the fibers from the first unit composite layer is disposed through the second unit fiber composite layer and in locking contact with the second opposed side;
at least a third unit fiber composite layer having a plurality of third fibers having a respective relative fiber directions of about 0°, and 60° and −60° with respect to the fiber directions of about 0° of the first unit fiber composite layer and a third side adjacent the second fiber composite layer and a fourth opposed side, such that a portion of fibers from the second unit composite layer is disposed through the third layer and in locking contact with the fourth opposed side; and
resin secured to each of the composite unit layers, the unit layers being three-dimensionally woven together with fibers from the first unit composite layer being mechanically linked to fibers from one of the third unit fiber composite layer and a deeper composite layer.

2. The composite structure of claim 1, wherein the composite unit layers comprise at least one of a curved or non-planar section.

3. The composite structure of claim 2, further comprising a fourth skin composite layer attached to only a tangent of the one of the curved or non-planar section.

4. The composite structure of claim 1, wherein the composite layers define a cylindrical shape.

5. The composite structure of claim 1, wherein the composite layers define a substantially semi-spherical shape.

6. The composite structure of claim 1, wherein the composite layers define a repeating corrugated shape.

7. The composite structure of claim 1, wherein the composite layers provide aircraft armor operable to substantially stop complete projectile perforation.

8. The composite structure of claim 1, wherein the composite layers provide land vehicle armor operable to substantially stop complete projectile perforation.

9. The composite structure of claim 1, wherein fibers in one of the composite layers are oriented at or between 60° and −60° relative to an adjacent composite layer.

10. A composite structure comprising:
a first fiber composite layer having a first reinforcing layer having a plurality of first fibers having a respective relative fiber directions of about 0°, and 60° and −60°;
at least a second fiber composite layer having a plurality of second fibers having a respective relative fiber directions of about 0°, and 60° and −60° in relation to the relative fiber direction of about 0° of the first composite layer, the second layer having a first side adjacent the first fiber composite layer and a second opposed side, a portion of the fibers from the first unit composite layer being disposed through the second layer in contact with the second opposed side;
a third fiber composite layer having a third reinforcing layer having a plurality of third fibers having a respective relative fiber directions of about 0°, and 60° and −60°, in relation to the relative fiber direction of about 0° of the first composite layer, the third layer having a third layer opposed side, a portion of the fibers from the second unit composite layer being disposed through the third layer and in contact with the third layer opposed side;
resin secured to each of the composite unit layers.

11. The composite structure of claim 10, further comprising an optically clear matrix, and wherein the first fibers and second fibers are optically clear.

\* \* \* \* \*